April 7, 1942.　　　　S. WAY　　　　2,279,216

GEAR AND PINION

Filed Nov. 4, 1939

Smooth and Hard Teeth.

Relatively Rough and Soft Teeth.

WITNESSES:

INVENTOR
Stewart Way.
BY
Paul E. Friedemann
ATTORNEY

Patented Apr. 7, 1942

2,279,216

UNITED STATES PATENT OFFICE 2,279,216

GEAR AND PINION

Stewart Way, Wilkinsburg, Pa., assignor to Westinghouse Electric & Manufacturing Company, East Pittsburgh, Pa., a corporation of Pennsylvania Application November 4, 1939, Serial No. 302,879

2 Claims. (Cl. 74—460)

My invention relates to a mechanical drive, more specifically, to one including a pair of gears which are in meshing relationship, one of said gears having teeth which are smoother and harder than the teeth of the other so as to effect burnishing of such other teeth during normal operation of the gears.

That the use of a fine surface finish on the teeth of a pinion and gear which are adapted to mesh will increase the resistance of both to pitting is now generally known. The provision of such fine surface finish upon the teeth of both gears, however, naturally involves additional manufacturing operations and expense, especially with respect to the larger gear, since it may have a substantially larger number of teeth than the smaller gear or pinion.

In accordance with my invention, I have found that it is not necessary to polish the teeth of both the pinion and gear, but it is merely necessary to polish the teeth of the pinion alone in order to secure a substantially increased resistance against pitting and an increase in the load carrying capacity.

I have also found that if the pinion has teeth which are both smoother and harder than those of the gear, a substantial burnishing of the gear will inherently result during normal operation, tending to gradually increase the load carrying capacity and the resistance against pitting of the pinion and gear.

An object of my invention is to provide a mechanical drive including a pinion and gear in meshing relationship which requires a minimum amount of preliminary smoothing or finishing in order to effect a substantial increase in the load carrying capacity and in resistance against pitting.

Figure 1:
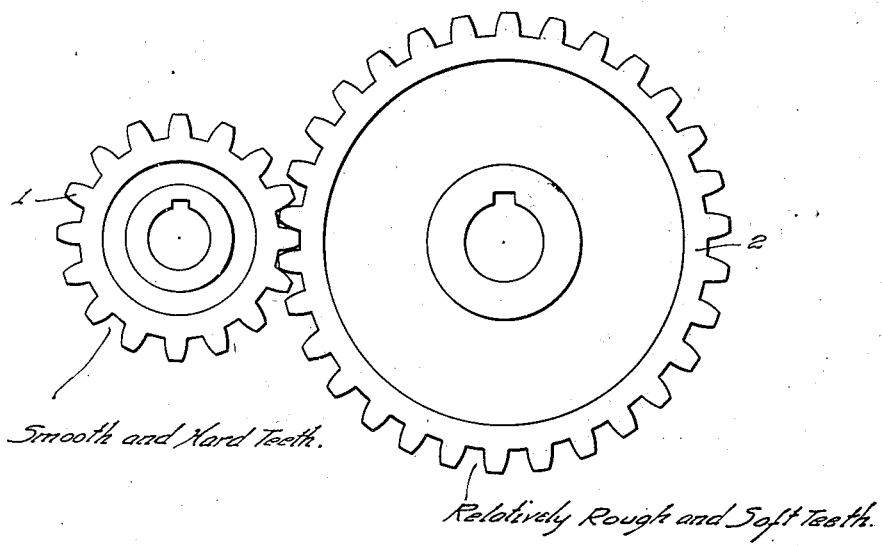
Figure 2:
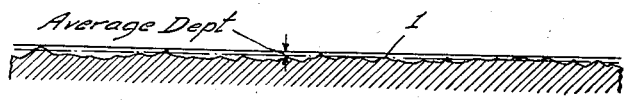

Other objects and advantages will become more apparent from a study of the following specification which considered in conjunction with the accompanying drawing, in which:

Figure 1 is a schematic showing of a pinion and a gear in meshing relationship and which are adapted to form a part of any suitable mechanical drive (not shown); and Fig. 2 is a magnified showing of a portion of a toothed surface of pinion 1.

Referring more particularly to Fig. 1, numeral 1 denotes a pinion and numeral 2 denotes a gear. I have found that it is unnecessary to provide a smooth surface on the teeth of the gear, provided the teeth of the pinion alone are made smooth. In order to more clearly show the relative effects of various progressive operations on the gear, the following comparisons are noted:

Let us assume for simplicity that the safe loading of the pinion and gear in terms of contact compressive stress in the area of contact between mating teeth is 100 units in the case in which both the pinion and gear are made of the same material and have tooth surfaces which are relatively rough (ground). If instead, the pinion is made smooth (polished) and the gear is left with its somewhat rough (ground) surface, the safe loading may be expected to increase to 130 units. On the other hand, if both the pinion and gear are smoothened or polished, a safe loading of 200 units may be expected. Going a step further, if it is assumed that the pinion is not only made smoother (polished) but substantially harder than the gear, despite the fact that the teeth of the gear are left relatively rough (ground), an increase to over 200 units may be expected as the result of both increasing the hardness and smoothness of the pinion teeth alone. I have found further that the pinion teeth should be at least 50 V. P. N. (Vickers pyramid units) harder than the gear teeth in order to effect a noticeable increase in loading above the 130 value mentioned above. Preferably, the difference in hardness should be greater, that is, of the order of at least 150 or 200 V. P. N. units difference. While the difference in hardness according to present known methods, such as nitriding of surfaces, may be made of the order of 600 V. P. N. units, or even more, the more practical range for the difference in hardness so as to obtain appreciable burnishing with the least amount of difficulty in manufacture would be approximately between 150 and 300 V. P. N. As far as I am aware, the theory which accounts for the increase in load carrying capacity of the gear and pinion as a result of making the pinion harder and smoother than the gear is that of the inherent burnishing action of the pinion on the gear during normal meshing operation. In other words, it appears that the pinion, since it is harder than the gear, has the ability to make the gear teeth correspond to the shape of the teeth of the pinion, and further since the pinion has smooth teeth, the shape imposed or impressed on the gear will be that of the smooth toothed pinion. In other words, as a result of wear, the gear teeth will gradually shape themselves in accordance with the smooth finished design of the pinion teeth, and thus reduce or eliminate severe concentrations of contact pressure causing pitting. The cold working of the gear tooth metal accompanying this smoothing action is also beneficial in increasing its strength.

Fig. 2 is a magnified showing of the top surface of the portion of the gear teeth, for example, those of the pinion 1. A convenient way of measuring roughness or smoothness is by referring to the average depth below a smooth surface tangent to the highest peaks of the irregularities as indicated by the arrows in Fig. 2. I have found that the pinion should not have a roughness which exceeds an average depth of 0.00003 of an inch below a smooth surface tangent to the highest peaks of the irregularities. Of course, the lower this average depth, that is, the smoother the pinion teeth, the greater will be the load carrying capacity and resistance to pitting of the combination.

It will be apparent that in order to secure increase in load carrying capacity and resistance against pitting, the pinion must be smoother and of the same material—or better, smoother and of a harder material than the gear. To make a rough surfaced pinion only harder than the gear without at the same time making it smoother will not have a desirable effect for now the pinion, while it will have a burnishing effect on the gear, will merely impress on the gear a surface which is just as irregular as that of the pinion, therefore, effecting no advantages. It should be noted that my invention is also applicable to rollers as well as to gears.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. A mechanical drive including, in combination, a pinion and a gear arranged in meshing relationship, said pinion having polished teeth which are substantially smoother than those of said gear and having a surface having an average deph which does not exceed 0.00003 inch below a smooth surface tangent to the top peaks of the irregularities, said pinion being also harder than said gear, the difference in hardness being at least 150 Vickers Pyramid Units, thereby effecting burnishing of said gear during normal meshing relationship.

2. A mechanical drive including, in combination, a pinion and a gear arranged in meshing relationship, said pinion having polished teeth which are substantially smoother than those of said gear and having a surface having an average depth which does not exceed 0.00003 inch below a smooth surface tangent to the top peaks of the irregularities, said pinion being also harder than said gear, the difference in hardness being between 150 and 300 Vickers Pyramid Units, thereby effecting burnishing of said gear during normal meshing relationship.

STEWART WAY.